Jan. 12, 1965 F. MORING 3,165,260

DATA TRANSFER DEVICE

Filed Dec. 3, 1962 3 Sheets-Sheet 1

INVENTOR
FRED MORING

BY G. R. Gugger
AGENT

Jan. 12, 1965 F. MORING 3,165,260

DATA TRANSFER DEVICE

Filed Dec. 3, 1962 3 Sheets-Sheet 2

3,165,260
DATA TRANSFER DEVICE

Fred Moring, Endwell, N.Y., assignor to International Business Machines Corporation, New York, N.Y., a corporation of New York Filed Dec. 3, 1962, Ser. No. 241,598
6 Claims. (Cl. 234—78)

This invention relates to a data transfer device and more particularly to portable apparatus for transferring the information represented on individual data bearing control records onto another record, such as a paper tape.

The present invention, although not limited to, is directed primarily to the processing of records used to identify merchandise. Such records usually take the form of perforated tags which are suited for attachment to merchandise or like articles, the record tag being provided with data indications which may be visually read as well as automatically read by special data processing equipment. In the ordinary course of business, upon sale or other disposal of the article, the tag or a duplicate section thereof is removed from the article and sent to a central data processing area having special equipment designed to read the data from the tag and reproduce such data into another record form. Generally, the tags are collected in large numbers before being sent to the central area for processing.

There are times, however, such as when taking inventory of articles on hand, when it is neither practical nor advisable to remove the tags from the articles and process them in a remote central area since the tags would later have to be reattached to the related articles which results in a time consuming, error-prone operation. And taking inventory manually by way of handwritten reports has also proved to be expensive and impractical since a great amount of time and care must be exercised to avoid errors.

In an attempt to provide a means for gathering information from the tags without removing the tags from the articles to which they are attached, portable sensing devices have been used which can be carried to the articles and into which the tags may be inserted for the sensing of data thereon. Such portable devices have been electrically connected by way of a flexible cable to a tape punch unit located in the central processing area or it has been suggested that the tape punch unit may be suitably encased and mounted on wheels so that it may be moved nearer to the data source. The one system involved the use of a substantial amount of electrical cable disposed about the store and the other system necessitates the burdensome wheeling around of the tape punch unit.

In providing a more practical approach, the present invention provides a portable hand-held information transfer recording device which will accept a coded template, document or merchandise tag without detaching the tag from its related article and transfer the coded information from the tag to a paper tape by means of perforations without the need for remote cable connected tape punching machines. In the use of the present device, the tag is coded in anti-code fashion wherein a hole is punched into the tag to represent undesired information with the remaining material of the tag representing the desired information. The tag is placed into the throat of the present device and located against an array of punches, one punch for every possible hole to be punched in the tag. The tag is urged forward onto the array of punches and by virtue of this movement those punches not encountering a hole in the tag are urged forward and perforate a paper tape. Those punches encountering a hole in the tag remain inactive and the transfer process results in a punched hole in the tape at a location where there is not a punched hole in the tag.

The present device carries its own supply of paper tape mounted between a supply reel and a take-up reel and the force that urges the tag toward the punches also, through appropriate linkages, indexes the paper tape prior to each transfer operation. The perforated paper tape used is compatible with the tape used in the paper tape readers in general use throughout the industry. Any desired coding can be obtained in the paper tape simply by providing the proper coding in the template, document or merchandise tag. A feature of the present device resides in the fact that it serves both as a desk model and as a portable unit to further meet the needs of the retail store utilizing garment or merchandise tags. As a desk model, it serves the purpose of enabling the clerk to transfer the information from the garment tag into a paper tape at the time of sale. This tape, without any intermediate processes, can be read in a paper tape reader and such information as inventory status and other necessary retail store information can be readily obtained. The portability feature of the machine permits a person to take inventory by going to a rack of garments, inserting the tag without removing it from the garment into the throat of the machine, and transferring the tag information directly into the paper tape without the necessity of cable connected equipment or hand copying.

Accordingly, a principal object of the present invention is to provide an improved portable device for transferring information represented on individual data bearing records onto another record.

A further object of the present invention is to provide a portable hand-held device for transferring information represented on individual data bearing merchandise tags, or the like, directly onto a tape without removing the tags from the article to which they are attached.

A still further object of the present invention is to provide a portable hand-held device having punching instrumentalities operable upon the insertion of a data bearing record into the device to transfer information from said record to a paper tape carried by said device.

Another object of the present invention is to provide a portable hand-held transfer device as in the preceding object and including means for indexing the tape prior to each transfer operation.

The foregoing and other objects, features and advantages of the invention will be apparent from the following more particular description of a preferred embodiment of the invention, as illustrated in the accompanying drawings.

Figure 1:
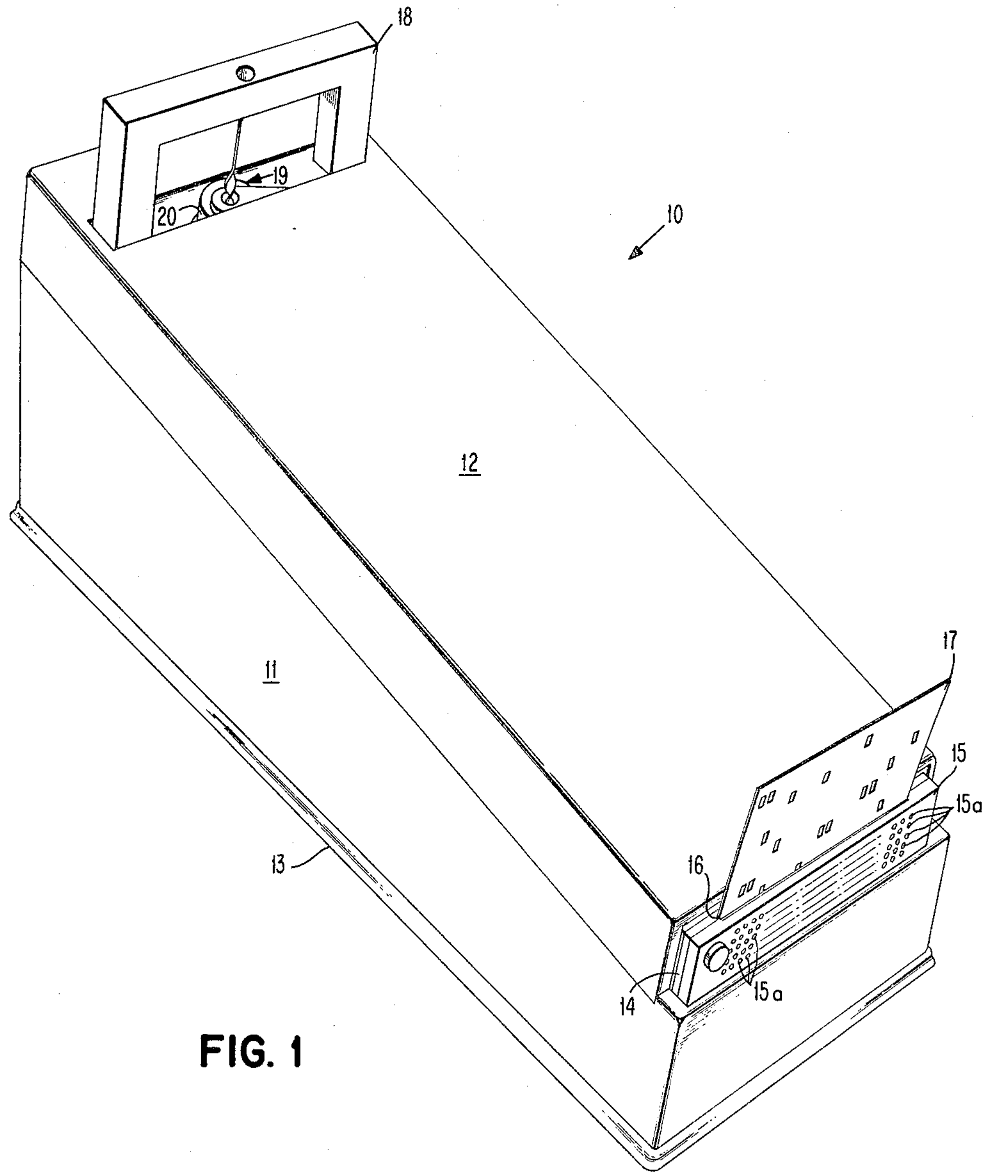
FIG. 1 is a perspective view of the portable hand-held data transfer device in which the invention is embodied.

Referring to FIG. 1, the general configuration of the portable hand-held transfer device 10 is shown as comprising a generally rectangular hollow base shell 11 having a removable cover 12. The base and cover may be made out of any light material such as thin metal, wood or plastic and the over-all dimensions of the device need not exceed, for example, a length of 12 inches, width of 4½ inches and a maximum height of 3½ inches to facilitate hand holding of the device during the transfer operation or use as a desk model. A rubber cushion 13 is provided around the bottom of the device.

Located at one end of the device is a pair of punch guide plates 14 and 15 which, as will be seen, serve to guide the movement of the punches and which also provide a slot or throat 16 into which a data bearing record, such as the merchandise tag 17, may be inserted. At the opposite end of the device an operating handle 18 is supported for movement in a vertical direction. The operating handle functions, in a manner to be described, to effect operation of the punches to carry out a transfer operation and also to operate a spiral drive member 19 to advance a tape feed sprocket 20.

Referring now to FIGS. 2, 3, 4 and 7, a support plate 21 extends across the top of the base 11 and is affixed to the side panels thereof by way of the spacer bars 22, 23, 24 and 25. Plate 21 serves to support the tag throat, the punching mechanism, the paper tape and the paper tape sprocket drive mechanism. The punch guide plates 14 and 15 which form the tag throat for holding a tag during a transfer operation are slidedably mounted on the support plate 21, the support plate serving as a seat for the inserted tag. Attached to the ends of the punch guide plate 14 is a pair of block members 26 and the punch guide plates and tag throat assembly is guided for horizontal movement along the surface of the support plate 21 by a pair of rods 27 which are attached to the throat assembly by means of their threaded ends 28. The rods 27 slideably fit into grooves 29 cut into the sides of a pair of guide plates 30 fastened to the support plate 21.

Figure 4:
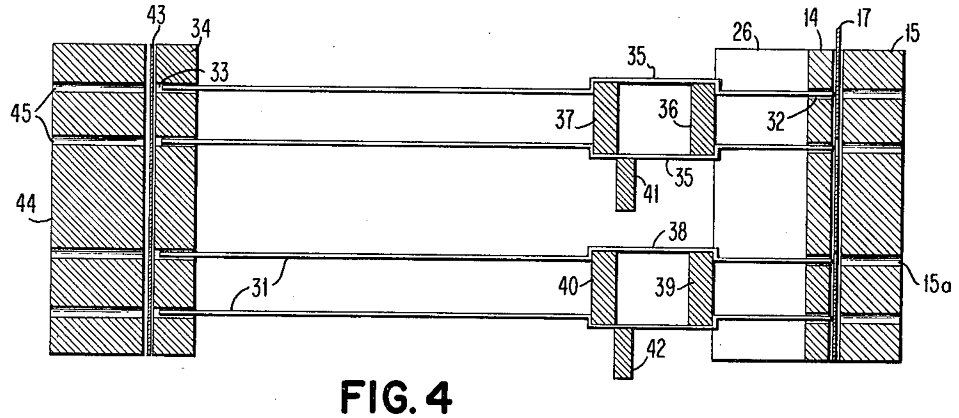
FIG. 4 is a sectional view taken on line 4—4 of FIG. 2 showing the punching instrumentalities in normal non-punching position.

The punching mechanism comprises a plurality of punch elements 31, there being one punch element for every coded data position on the tag 17. As shown in FIG. 4, in the particular embodiment of the present device chosen for illustrative purposes there are four layers of punch elements which normally slideably extend between guide holes 32 in the rear guide plate 14 and guide holes 33 in a front guide plate 34 which is fastened to the ends of the guide plates 30. The punch elements in the two top layers have oppositely extending U-shaped portions 35 which embrace between them a return bail 36 fastened between the blocks 26 for movement therewith and a stationary stop bail 37 fastened between the guide plates 30. Similarly, the punch elements in the two bottom layers have oppositely extending U-shaped portions 38 which embrace between them the return bail 39 fastened between the blocks 26 for movement therewith and the stationary stop bail 40 fastened between the guide plates 30. Additional bails 41 and 42 are fastened between the guide plates 30 and serve to support the second and fourth layers of punch elements.

It can be seen that all of the punch elements 31 are adapted to be moved horizontally toward the left to effect punching operations on a paper tape 43 which is threaded between the front guide plate 34 and a stationary die plate 44 mounted on the support plate 21 and provided with die holes 45 for receiving the punch elements. As was previously mentioned, in the use of the present device the tag 17 itself is used to mechanically displace the punches to transfer information onto the tape. Motion is imparted to the tag by reciprocating the tag throat assembly which comprises the guide plates 14, 15, the pair of block members 26, and the pair of rods 27.

Figure 2:
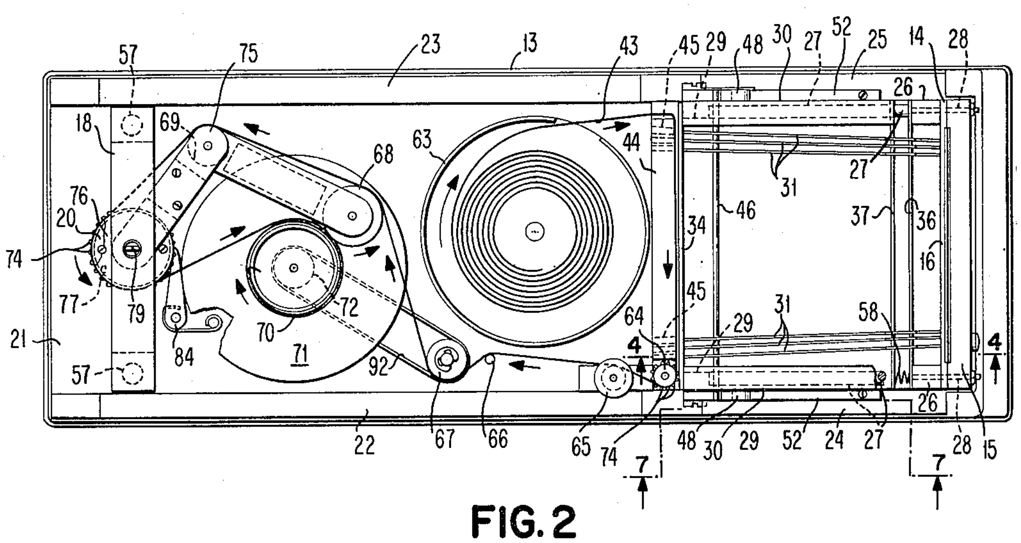
FIG. 2 is a plan view of the device of FIG. 1 with the top cover removed showing the general arrangement of the punching instrumentalities and the paper tape mechanism.
Figure 3:
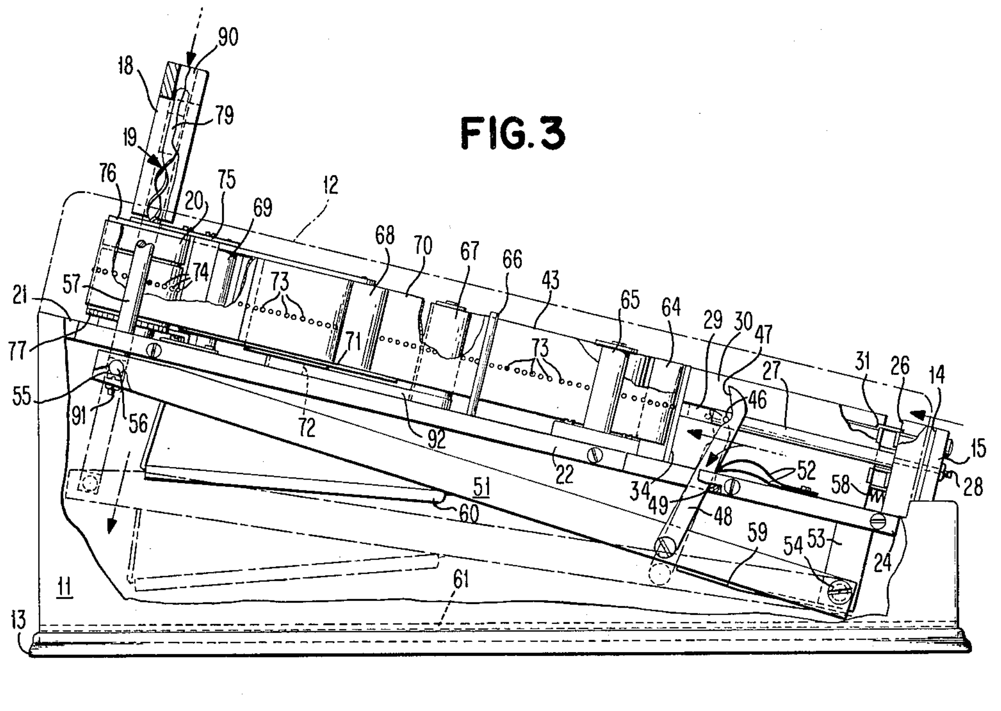
FIG. 3 is an elevation view looking at the left side of the device of FIG. 1 with the top cover removed and with a portion of the left side plate removed to show the operating linkages of the device.
Figure 7:
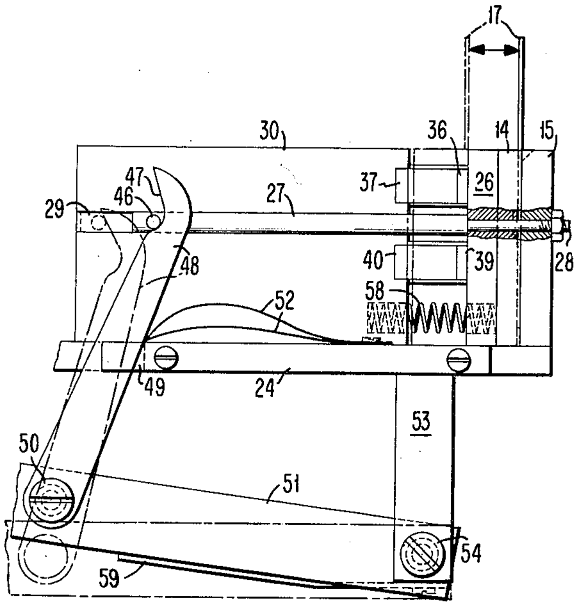
FIG. 7 is a sectional view taken on line 7—7 of FIG. 2 showing the actuating mechanism for the punching instrumentalities.

Referring to FIGS. 2, 3 and 7, the rods 27 have a long thin rod 46 fastened between them and the ends of the rod 46 are disposed for coaction with the camming surfaces 47 of the cam levers 48 positioned on each side of the tag throat assembly. The cam levers 48 extend down through grooves 49 cut in the spacer bars 24, 25 and each lever has a pivot connection 50 with a movable frame unit 51. Spring blades 52 fastened to the tops of the spacer bars 24, 25 are provided to bias the cam levers against the rod 46. The frame unit 51 is pivotally connected at one end to a fixed block 53 by means of pivot connections 54. The other end of the frame unit has a crossbar 55 (FIG. 3) pivotally connected thereto by means of pivot connections 56. The crossbar 55 is fastened to the operating handle 18 by means of a pair of rods 57 which slideably extend through suitable holes in the support plate 21.

Figure 5:
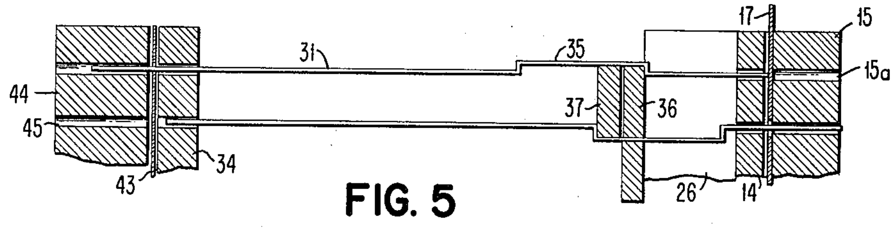
FIG. 5 is a partial view of FIG. 4 showing a punch instrumentality in punching position.

To carry out a punching transfer operation, particularly when the device is being used as a desk model, a tag 17 is inserted into the throat assembly and handle 18 is depressed downward pivoting the frame unit 51 counterclockwise to the dotted position shown in FIG. 3. As a result of this motion, the cam levers 48 are pulled downward in the grooves 49 and the camming surfaces 47 coact with rod 46 to drive the throat assembly and tag forward toward the tape 43 until the return bails 36, 39 abut against the stop bails 37, 40, as shown in FIG. 5. Those punch elements 31 which are engaged by solid portions of the moving tag are driven forward by the tag to punch corresponding positions on the paper tape 43, as shown by the uppermost punch in FIG. 5. Those punch elements which encounter perforated portions on the tag are not moved from their normal nonpunching position, the rear guide plate 15 being provided with punch receiving holes 15*a* at all punching positions. Consequently, in transferring information from the tag to the tape, a punched hole is placed in the tape at all code positions where there is not a punched hole in the tag. Upon release of the handle 18, coil spring 58 (FIG. 7), mounted between the block members 26 and the guide plates 30 and a leaf spring 59 attached to the bottom of the block 53, function to return the tag throat assembly, the cam levers 48 and frame unit 51, and the handle 18 back to their normal position. As the tag throat assembly moves back, the return bails 36, 39 restore back to normal position those punches which are actuated. The fixed stop bails stop the punch elements in proper position to insure throat clearance for the insertion and removal of a tag. The device is sufficiently light to enable the operator to hold the base in one hand, insert the tag without removing it from the article and operate handle 18 with the other hand to carry out a transfer operation.

To further facilitate carrying of the device to the tagged article or merchandise and operation of the device as a hand-held device without having to remove the tag from the article to which it is attached, a second handle 60 (FIG. 3) is attached to the underside of the frame unit 51 and a fixed narrow bar 61 extends longitudinally across the open bottom of the base shell or casing 11. The device may be held in one hand by grasping the handle 60 and bar 61, the tag inserted with the other hand and then the handle 60 and bar 61 squeezed together to pull down frame unit 51 and carry out the transfer punching operation above described.

Referring to FIGS. 2 and 3, a supply roll of the paper tape 43 is shown positioned around a stud 62 and within a circular guide wall 63 affixed to the top of the support plate 21. The tape emerges through an opening in the guide wall and is threaded between the print guide plate 34 and the stationary die plate 44 which make up the tape punching station. From the punching station, the tape is threaded in succession around a sprocket idler roll and an idler roll 65, both of which are rotatably mounted on the support plate 21, a fixed guide stud 66, a driven sprocket roll 67, a rubber tension roll 68 and rotatable sleeve 69, and the tape drive sprocket drum 20. From the drum 20, the tape is wound onto a take-up drum 70 having a circular base 71 which is fastened on a stud 72 rotatably supported on plate 21. The tape is provided with a row of feed holes 73 which receive the sprocket pins 74 located on rolls 64 and 67 and on drive drum 20.

Figure 6:
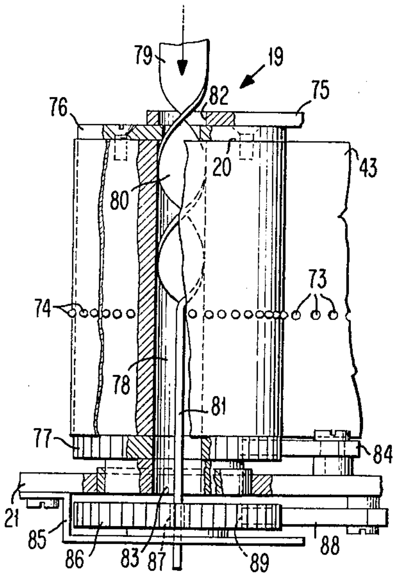
FIG. 6 is an elevation view of the tape advance drum partially broken away to show the drum driver.

The drive drum 20 is rotatably supported between the link 75 and the plate 21 and it has fastened thereto at the top a cam plate 76 and at the bottom a detent wheel or gear 77. Referring to FIG. 6, the drum is shown as having a hollow center portion 78 for receiving the drive member 19 which is composed of an upper flat shank portion 79, a spiral portion 80 and a lower flat shank portion 81. The top plate 76 of the drum is provided with an internal cam portion 82 for coaction with the spiral portion 80 of member 19 and the bottom detent gear 77 of the drum is provided with a hollow center portion 83 for allowing the bottom shank portion 81 of member 19 to extend through the support plate 21. Pivotally mounted on top of plate 21 is a spring biased detent pawl 84 which coacts with the teeth on drum gear 77 to prevent any clockwise rotation of the drum 20. Rotatably mounted on a support bracket 85, attached to the underside of plate 21, is a detent wheel 86 which is provided with a center slot 87 for receiving the lower shank portion 81 of the drive member 19. Pivotally mounted to the underside of the plate 21 is a spring biased pawl 88 which coacts with a single tooth 89 in the periphery of wheel 86 to prevent clockwise rotation of the detent wheel 86. As shown in FIG. 3, the end of the upper shank portion 79 of drive member 19 is disposed freely within a guide hole 90 in the handle 18 and the end of the lower shank portion 81 of member 19 has a threaded portion 91 which is fastened to the crossbar 55 of frame unit 51.

In operation of the tape drive, when either handle 18 is pushed down or handle 60 is pulled down to initiate a punch transfer operation the frame unit 51 pivots counterclockwise pulling the spiral drive member 19 downward. Since the detent wheel 86 is locked against clockwise rotation by pawl 88, the drive member 19 is prevented from turning clockwise by virtue of the slot 87 thus enabling the spiral portion 80 to move downward without rotating and coact with the internal cam surface in plate 76 to drive the tape drum sprocket 20 in a counterclockwise direction. During the travel of the drum, the sprocket pins 74 pull the tape 43 out of the supply chamber 63 feeding it through the punching station and along the previously described path to the take-up drum 70. As the tape feeds, the sprocket roll 67, by means of a belt 92 (FIG. 2), causes the take-up drum to rotate clockwise as the tape is being fed onto it. The tape is advanced on each downstroke of the spiral drive member with the increment of advance being completed before the spiral drive member reaches the limit of its downward travel and before the punch elements reach the tape to perforate same. The length of the spiral portion 80 is such that the increment of each tape advance is sufficient to position a new section of tape across the entire punch die 44.

When the punch elements have perforated the tape and either handle 18 or 60 is released, the frame unit 51 is spring returned upward driving the spiral drive member 19 back up to its normal position. The pawl 84 prevents the detent gear 77 and hence the drive sprocket drum 20 from rotating clockwise; however, the pawl 88 does not prevent the lower detent wheel from rotating counterclockwise thus enabling the spiral drive member to be re-wound in a counterclockwise direction by the cam surface 82 during its upward travel.

While the invention has been particularly shown and described with reference to a preferred embodiment thereof, it will be understood by those skilled in the art that various changes in form and details may be made therein without departing from the spirit and scope of the invention.

What is claimed is:

1. A portable data transfer device adapted to be hand held and operated to transfer onto a tape information recorded on individual records which remain attached to their related articles which comprises:

movable means for holding an inserted record bearing information in the form of code perforations;

a supply of tape;

means for supporting a portion of said tape in position to be punched;

a plurality of movable punch elements disposed between said tape portion and said record holding means;

actuator means connected with said record holding means and manually operable to move same and a record inserted therein toward said tape portion whereby selected punch elements will be displaced by the record to transfer information from said record onto said tape;

a handle member connected with said actuator means for moving same; and a stationary member in proximity with said handle member, said handle member and stationary member providing a hand grip by which said device may be held in one hand of an operator for carrying and presenting the device to individual records which remain attached to the articles to which they relate and which members may be squeezed together by said one hand to operate said actuator means to transfer information from an inserted record to said tape.

2. A portable data transfer device as defined in claim 1 and including:

means effective upon release of said handle member for restoring said record holding means back to its record inserting position; and means associated with said record holding means and effective during restoration of same to restore said punch elements to their nonpunching position.

3. A portable data transfer device adapted to be hand held and operated to transfer onto a tape information recorded on individual records which remain attached to their related articles which comprises:

movable means for holding an inserted individual record bearing information in the form of code perforations;

a supply of tape;

means for supporting a portion of said tape in position to be punched;

a plurality of movable punch elements disposed between said tape portion and said record holding means;

manually operable actuator means;

means connecting said actuator means with said record holding means and effective during each operation of said actuator means to move said holding means and an inserted record toward said tape portion whereby selected punch elements will be displaced by the record to transfer information from said record onto said tape;

a rotatable drum for supporting and advancing said tape;

rotatable and reciprocable spiral drive means associated with said drum and operated by said actuator means to reciprocate and thereby cause rotation of said drum to advance a portion of said tape for each transfer operation; and control means associated with said spiral drive means and drum for rendering said drum rotatable only in a tape advancing direction and for rendering said spiral drive means rotatable only in a rewind direction.

4. In a portable data transfer device adapted to be hand held and operated to transfer onto a tape information recorded on individual records which remain attached to their related articles:

a supply of tape;

a rotatable hollow drum for supporting and advancing a portion of tape;

an internal cam surface associated with the hollow portion of said drum;

a rotatable and reciprocable spiral drive member extending through the hollow portion of said drum for coaction with said cam surface;

manually operable actuator means for reciprocating said spiral drive member;

detent means effective during reciprocation of said spiral member in one direction to prevent rotation of said member whereby said member will cam said drum to rotate and advance an increment of tape; and detent means effective during reciprocation of said spiral member in the opposite direction to prevent rotation of said drum whereby said spiral member will rotate and rewind itself preparatory to another tape advance.

5. A portable data transfer device adapted to be operated as a desk model or as a hand-held model to transfer onto a tape information recorded on individual records which comprises:

movable means for holding an inserted individual record bearing information in the form of code perforations;

a supply of tape;

means for supporting a portion of said tape in position to be punched;

a plurality of movable punch elements disposed between said tape portion and said record holding means;

actuator means connected with said record holding means and manually operable to move same and a record inserted therein toward said tape portion whereby selected punch elements will be displaced by the record to transfer information from said record onto said tape;

hand gripper means connected with said actuator means by which said device may be held in one hand of an operator for carrying and presenting the device to individual records and by which said actuator means may be manually operated to transfer information from an inserted record to said tape; and manually depressible handle means also connected with said actuator means by which said actuator means may be manually operated to transfer information from an inserted record to said tape when said device is used as a desk model.

6. A portable transfer device as defined in claim 5 and including:

tape advancing means; and drive means connected to said actuator means and actuated thereby during each operation of said hand gripper means and said manually depressible handle means for operating said tape advancing means to advance an increment of tape into punching position prior to each transfer of information by said punch elements.

References Cited in the file of this patent

UNITED STATES PATENTS 2,736,379 Winn et al. ............ Feb. 28, 1956

FOREIGN PATENTS 509,561 Italy ................. Jan. 15, 1955